(12) United States Patent
Kruse

(10) Patent No.: US 6,276,649 B1
(45) Date of Patent: Aug. 21, 2001

(54) MULTIFUNCTION ADAPTER FOR SMOOTH SURFACE MOUNTING

(76) Inventor: Brian David Kruse, 6628 SE. 75th, Portland, OR (US) 97206

( * ) Notice: Subject to any disclaimer, the term of this patent is extended or adjusted under 35 U.S.C. 154(b) by 0 days.

(21) Appl. No.: 09/562,040

(22) Filed: May 1, 2000

Related U.S. Application Data

(60) Provisional application No. 60/133,307, filed on May 10, 1999.

(51) Int. Cl.$^7$ .................................................. A47B 91/00
(52) U.S. Cl. ................................. 248/346.01; 248/346.03
(58) Field of Search ..................... 248/346.01, 346.03, 248/346.06, 363, 206.2, 206.3, 678, 220.22

(56) References Cited

U.S. PATENT DOCUMENTS

| | | |
|---|---|---|
| 2,237,260 | 4/1941 | McDonald . |
| 2,250,387 | 7/1941 | McDonald . |
| 3,746,289 * | 7/1973 | Johnsen ................................... 310/91 |
| 4,219,178 * | 8/1980 | Assion ................................... 248/314 |
| 4,696,447 * | 9/1987 | Strecker ............................ 248/206.3 |
| 4,836,482 | 6/1989 | Sokol . |
| 4,900,286 * | 2/1990 | Buffalo ................................... 446/30 |
| 5,169,100 * | 12/1992 | Milcent et al. ..................... 248/68.1 |
| 5,198,829 | 3/1993 | Marshall . |
| 5,237,764 | 8/1993 | Gray . |
| 5,448,256 | 9/1995 | Ohashi et al. . |
| 5,456,433 | 10/1995 | Burns et al. . |
| 5,490,302 * | 2/1996 | Dion .................................... 15/210.1 |
| 5,542,641 * | 8/1996 | Donovan .............................. 248/493 |
| 5,617,680 | 4/1997 | Beatty . |
| 5,646,638 | 7/1997 | Winegard et al. . |
| 5,651,520 | 7/1997 | Belokin et al. . |
| 5,760,751 | 6/1998 | Gipson . |
| 6,010,102 * | 1/2000 | Dillion, Jr. ........................ 248/206.3 |

FOREIGN PATENT DOCUMENTS 52-23242    8/1975    (JP) .

* cited by examiner

Primary Examiner—Anita King
Assistant Examiner—Holly N. Sy

(57) ABSTRACT

A triangular planar member defines, through its thickness, four screw generally circular holes. The four holes may be disposed in relative relation to one another so as to generally define the corners of a rectangle. At the corners of the triangular planar member are corner couplers such as suction cups. The suction cups attach the adapter to the smooth surface. The holes in the adapter are utilized to accept screws in order to adapt, via the triangular planar member, a screw-mounted device to the smooth surface onto which it is either not possible or not desirable to screw-mount the device directly. In an optional embodiment of the present invention, the triangular planar member defines one hole and three slots for greater adaptability in terms of the types of devices it may receive.

2 Claims, 4 Drawing Sheets

MULTIFUNCTION ADAPTER FOR SMOOTH SURFACE MOUNTING

PRIORITY

This non-provisional patent application is based on, and claims priority to, provisional patent application Ser. No. 60/133,307, filed May 10, 1999.

TECHNICAL FIELD

The present invention relates to temporarily mounted adapters for providing smooth surface mounting support to a wide variety of devices.

BACKGROUND

It is often desirable to temporarily mount electronic or other devices to smooth vertical surfaces such as the windows or walls of a structure such as a dwelling or recreational vehicle. Among the devices commonly sought to be mounted are small satellite dishes (direct broadcast satellite, "DBS" in particular), stereo speakers, spotlights, weather monitoring devices, and the like.

Such devices are normally screwed directly into the structure or mounted on a bracket which has been screwed into the structure. Unfortunately, penetrating vinyl siding, shingles or sheet metal with screws compromises the weatherproofing characteristics of those materials. Furthermore, most rented or leased dwellings restrict the location or nature of allowed conventional mounting techniques.

Some devices, such as simple antennas, have been affixed to walls and windows by suction cups integral to the devices themselves. While suction cups are effective for easily and non-destructively mounting many devices, most devices are not commercially available with suction cups and suction cups are not easily adaptable to devices designed for screw mounting.

Accordingly, there is a need to provide an adapter apparatus to allow the secure and non-destructive mounting of screw-mounted devices to smooth surfaces.

There is another need to provide an adapter apparatus which can be easily adapted for use with a wide variety of devices sought to be mounted.

There is yet another need for an adapter apparatus which can be easily attached, then later detached from the smooth surface to which it was attached for re-mounting in a different location with a different device.

BRIEF SUMMARY OF THE INVENTION

The present invention relates to a multifunction adapter for smooth surface mounting. In an exemplary embodiment, the adapter comprises a planar member made which may be shaped as a triangle and may be made of a material such as Plexiglas, fiberglass or the like. The triangular planar member defines, through its thickness, four generally circular holes. The four holes may be disposed in relative relation to one another so as to generally define the corners of a rectangle.

At the corners of the triangular planar member are corner couplers such as suction cups. The suction cups attach the adapter to the smooth surface. The holes in the adapter are utilized to accept screws in order to adapt a screw-mounted device to the smooth surface onto which it is either not possible or not desirable to screw-mount the device directly.

In an optional embodiment of the present invention, the adapter defines one hole and three slots for greater adaptability in terms of the types of devices it may receive.

DETAILED DESCRIPTION OF EXEMPLARY EMBODIMENTS

Figure 1:
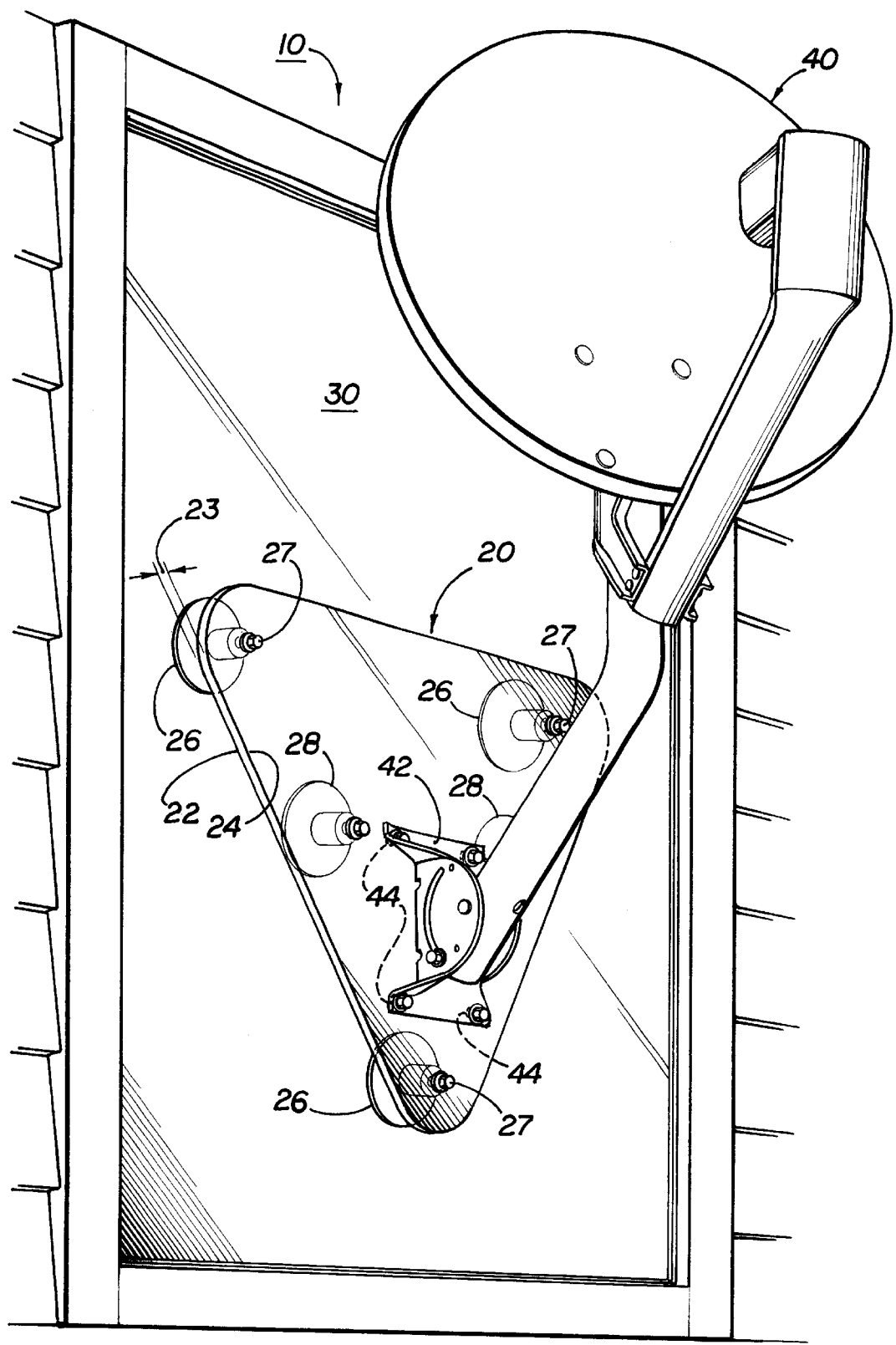
FIG. 1 depicts an exemplary embodiment of the present invention in an exemplary operating environment.

FIG. 1 depicts an exemplary embodiment of the present invention in an exemplary operating environment. More specifically, the installed embodiment 10 includes a multifunction adapter 20 attached to a window 30. As depicted, the multifunction adapter 20 is carrying a Digital Satellite System (DSS) dish 40.

Even more specifically, the multifunction adapter (hereafter "adapter", also referred to as "triangular planar member") 20 may be fabricated of a resilient polymer substance such as Plexiglas, fiberglass, or any similar substance. In the depicted embodiment, the adapter 20 is formed in the shape of a triangle to maximize the strength between the adapter 20 and the window 30 while reducing the weight of the adapter 20. Another advantage of the triangular shape of the adapter 20 may be the decreased wind profile—that is to say that the less amount of the adapter 20 outside the attachment footprint of the adapter 20, the less chance for wind to catch the adapter 20 and either remove it from the surface to which it is mounted or damage the surface to which it is attached.

The adapter 20 comprises a first side 22, a second side 24 in generally parallel planar arrangement and thereby defining a thickness 23 therebetween. The adapter 20 is attached to the window 20 by a plurality of corner couplers such as suction cups 26. The suction cups 26 may be permanently or removably attached to the first side 22 of the adapter 20 by any of a variety of well known means, including a screw 27 placed through a hole through the thickness 23 of the adapter 20 and secured into the suction cup 26. In the preferred embodiment, in which the adapter 20 is triangular in shape, the suction cups 26 are placed one in each corner of the triangle for greatest stability.

In an optional embodiment, intermediate couplers 28 may be positioned in locations other than the three corners of the adapter 20 and attached in the same fashion as the suction cups 26.

Finally, in the depicted exemplary embodiment, a DSS dish 40 is attached to the adapter 20. Most DSS dishes, such as DSS dish 40, have a mounting plate 42 which is machined or otherwise formed to allow screw mounting through screw holes 44 onto a generally planar surface. Rather than screw the DSS dish 40 onto a surface and thereby mar the surface, the DSS dish 40 may be screw mounted to the adapter 20 in a well known manner using receiving holes shown and described with reference to later figures.

Figure 2A:
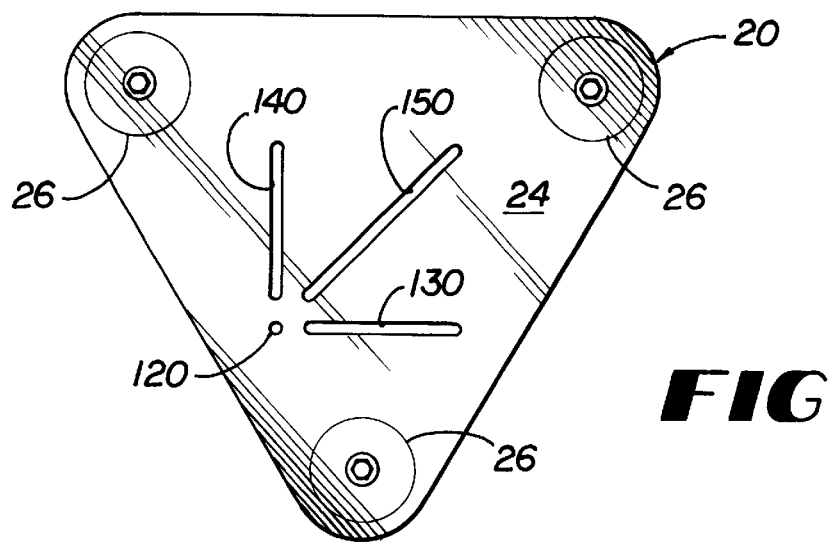
FIGS. 2a, 2b, and 2c depict exemplary arrangements for mounting holes (and slots) in various exemplary embodiments of the present invention.
Figure 2B:
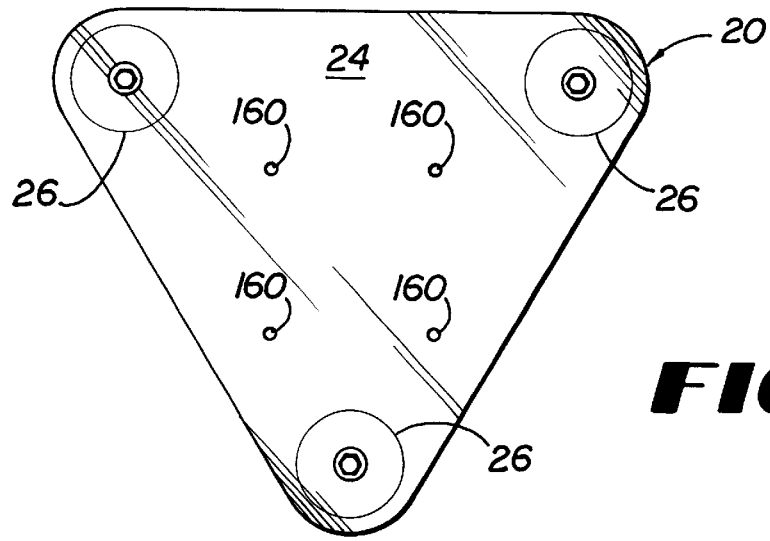
Figure 2C:
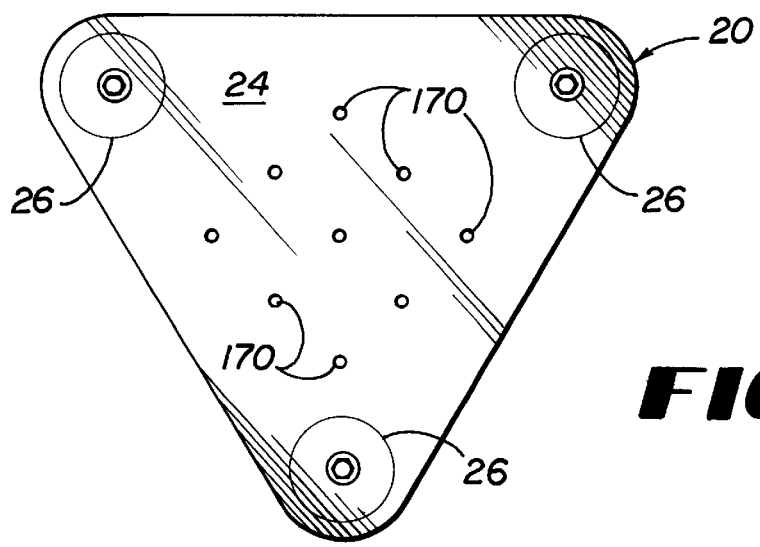

FIGS. 2a, 2b, and 2c depict exemplary arrangements for mounting holes (and slots) in various exemplary embodiments of the present invention. Each of FIGS. 2a, 2b, and 2c depict the adapter 20 as viewed from its second side 24. As previously described, the adapter 20 is generally triangular in shape and three corner couplers 26 have been attached to the first side of the adapter 20.

FIG. 2a depicts the most versatile embodiment for mounting adaptation to a wide variety of screw-mounted devices. More specifically, a generally round hole 120 is defined through the thickness 23 of the adapter 20. Importantly, positioned radially out from the center of the hole 120 is a first slot 130. Still radiating outwardly from the center of the hole 120 is a second slot 140, which second slot 140 is oriented at a position 90 degrees counter clockwise from the radial position of the first slot 130. Finally, a third slot, 150 also extends radially from the center of the hole 120, though at an orientation bisecting the 90 degree "spacing" between the first slot 130 and the second slot 140.

The slotted arrangement of FIG. 2a allows mounting of a wide variety of devices intended for screw-mounting. For instance, most screw-mounted devices require either two, three or four screws to complete the attachment. This slotted configuration can easily accommodate either. More particularly, if the device requires two screws for mounting, one screw could be placed into hole 120 and the second screw could be placed in a position within either first slot 130, second slot 140 or third slot 150, depending on the spacing required between the two screws and the final orientation desired for the object.

Optionally, one screw could be mounted within second slot 140 and the other screw could be mounted within the third slot 150 at a location along third slot 150 corresponding to the required spacing between the screws.

For an object requiring three screws, one screw each could be located within the three slots (thereby allowing the "T" screw configuration likely used in such a set-up. Finally, if the object requires four screws, as depicted in FIG. 1, the first screw could be placed in hole 120, then the three remaining screws placed in the three slots, easily accommodating a wide variety of spacing for the four screws.

FIG. 2b depicts another exemplary embodiment of the present invention. Specifically, holes 160 are positioned in a predetermined position suitable for accommodating a variety of devices. It is well known that many devices, in particular different devices of a particular species (different types of DSS dishes, for instance) typically utilize a screw mounting configuration that is identical. Accordingly, this hole configuration could easily carry a wide variety of DSS dishes. Additionally, it is quite likely that a generic placement of holes 160 could accommodate other devices, as well.

FIG. 2c depicts yet another exemplary embodiment of the present invention in which a larger number of holes 170 are placed through the thickness 23 of the adapter 20 to accommodate an even larger variety of devices that the configuration of FIG. 2b could accommodate. The holes 170 depicted in FIG. 2b are representative in nature and, in implementation, could be spaced in any sequence or any predetermined relative distance from each other, as particular anticipated needs or applications are determined.

Figure 3:
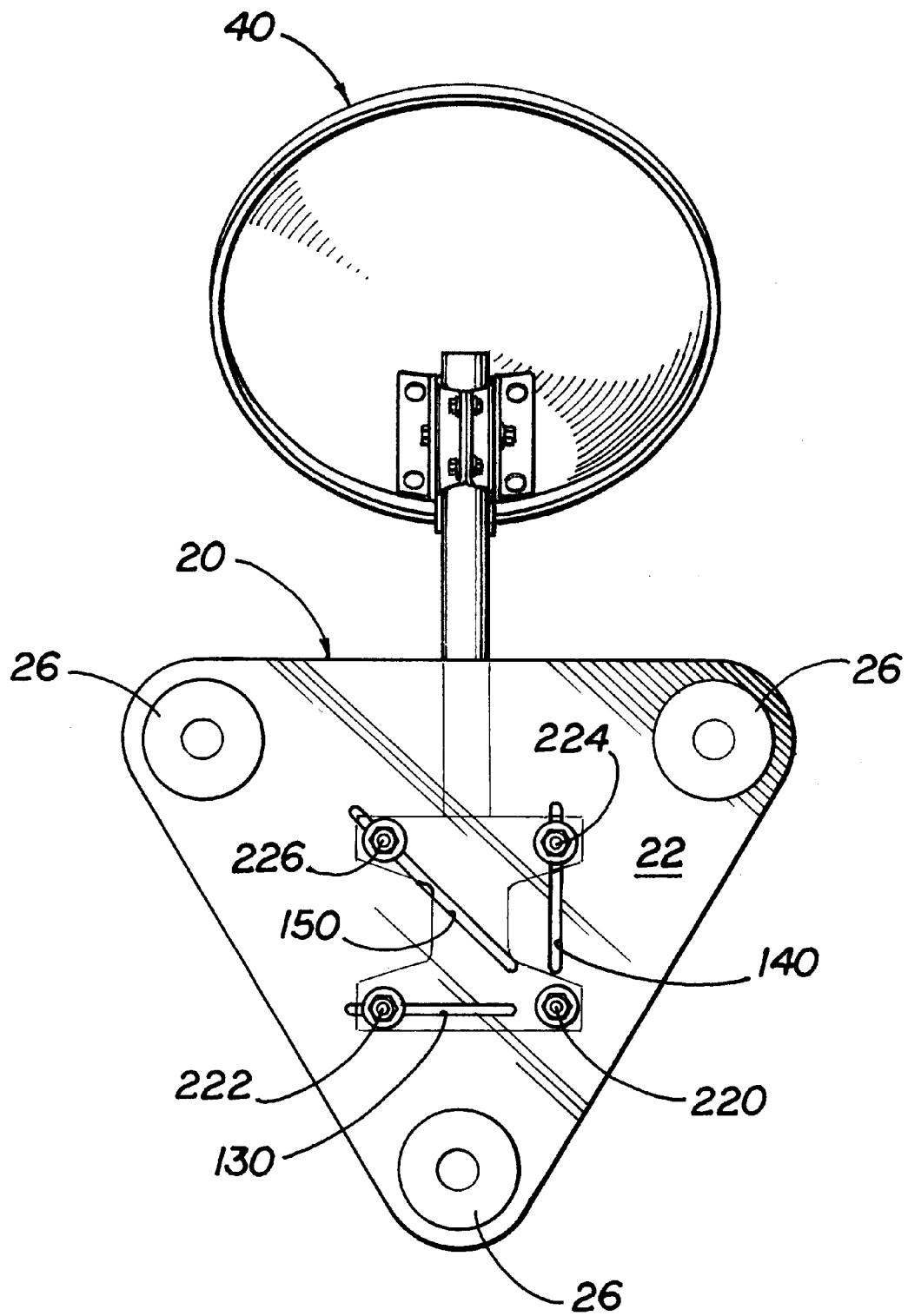
FIG. 3 depicts the "back" side of an exemplary embodiment of the present invention.

Turning now to FIG. 3, the "back" side of the adapter 20 is shown. In particular, the first side 22 of the adapter 20 reveals the manner in which the DSS dish 40 is mounted to an adapter 20 implementing the hole/slot configuration previously depicted and described with reference to FIG. 2a.

A first screw 220 is inserted through the hole 120 (not shown). The first screw 220 is then retained within the hole and snugged and secured appropriately via détente means such as a nut and washer. After the first screw 220 is positioned, the other holes 44 are aligned with the respective first slot 130, second slot 140, and third slot 150. After alignment, respective screws 222, 224 and 226 are inserted through the holes 44 and through the corresponding slots 130, 140, and 150 before being snugged and secured via détente means such as nuts and washers.

Figure 4A:
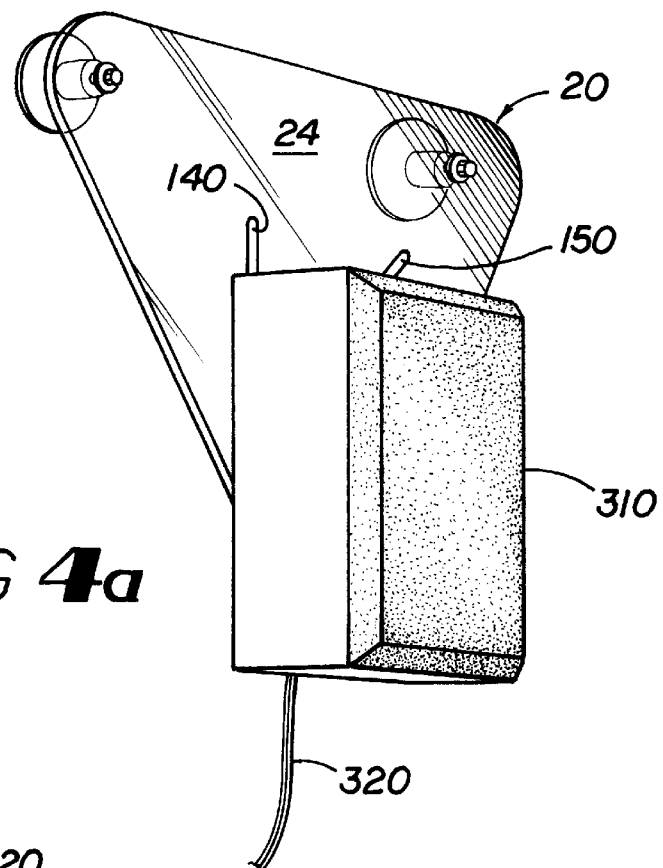
FIGS. 4a and 4b depict an additional aspect of an exemplary embodiment of the present invention.
Figure 4B:
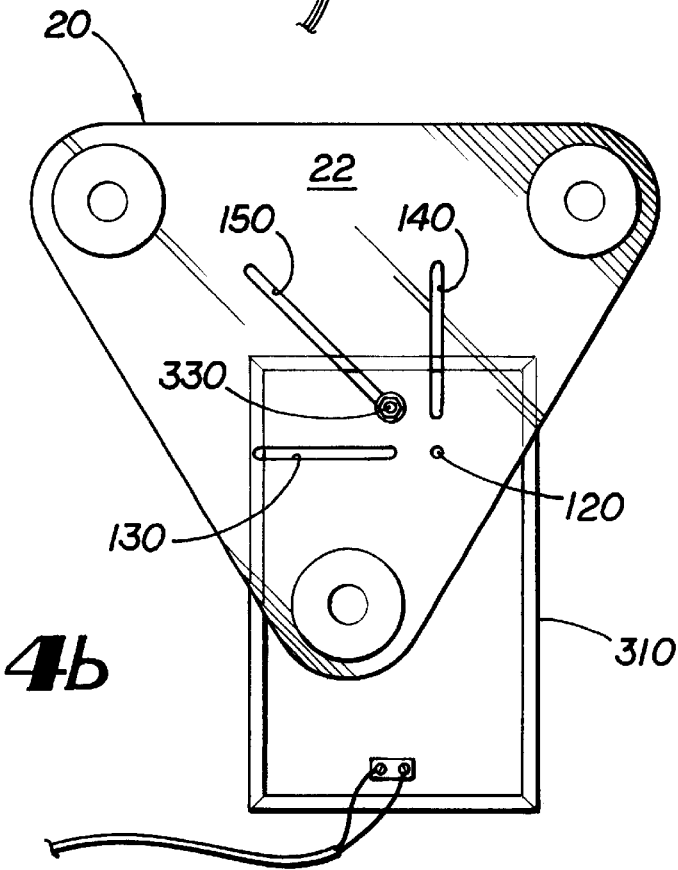

Finally, FIGS. 4a and 4b depict only one of the endless variety of additional uses which may be found for the adapter 20. As shown in FIG. 4a, the adapter 20 is easily adapted for mounting of a device such as a stereo speaker 310, as may be temporarily desired for an outdoor party or the like. Referring to FIG. 4b, the stereo speaker 310, powered by speaker wire 320, contains a single "hitch" mount (not shown) on the back of the speaker. As is well known to audiophiles, a hitch mount is most commonly a bracket secured to the back of the speaker or, alternately, a cut-out in the back frame of the speaker box to allow a nail head, screw head or other headed post-type device to hold the speaker in place. Such mounts are commonly used for smaller, portable-type speakers, since heavier speakers would place too great a strain on a single load bearing point.

Nonetheless, the speaker 310 is mounted to the adapter 20 by insertion of a screw 330 through either the hole 120, first slot 130, second slot 140 or third slot 150. For the sake of balance and proper distribution of weight, in the depicted embodiment, the screw is inserted and secured within the third slot 150. After the screw 330 is inserted and secured, the adapter 20 is mounted to the smooth vertical surface desired, and the stereo speaker 310 is hitched thereto in a well known manner.

Thus, from the depicted exemplary embodiments, it can be seen that the mounting options afforded by the adapter 20 are virtually limitless. Accordingly, the scope of the present invention should not be limited by the few exemplary embodiments described above, but only by the breadth of the claims articulated below.

I claim:

1. A multifunction adapter for smooth surface mounting, comprising:
   a. a triangular planar member having a first side and a second side, the first side and the second side being in parallel planar arrangement and defining a thickness therethrough, whereby the triangular planar member defines through the thickness
      a hole having a uniform radius,
      a first slot having a first length and oriented radially from the hole,
      a second slot having a second length equal to the first length and oriented radially from the hole and disposed 90 degrees from the first slot,
      a third slot having a third length greater than the first length and greater than the second length oriented radially from the hole and disposed equidistant, at each point along the third length, between the first slot and the second slot; and
   b. three corner couplers attached to the first side of the triangular planar member, each of the three corner couplers attached proximal to a respective corner of the triangular planar member.

2. The adapter of claim 1, further including at least two intermediate couplers attached to the first side of the triangular planar member.

* * * * *